Nov. 4, 1941.　　　　R. H. HEACOCK　　　　2,261,253
FILM SOUND PRODUCER
Filed Sept. 1, 1939
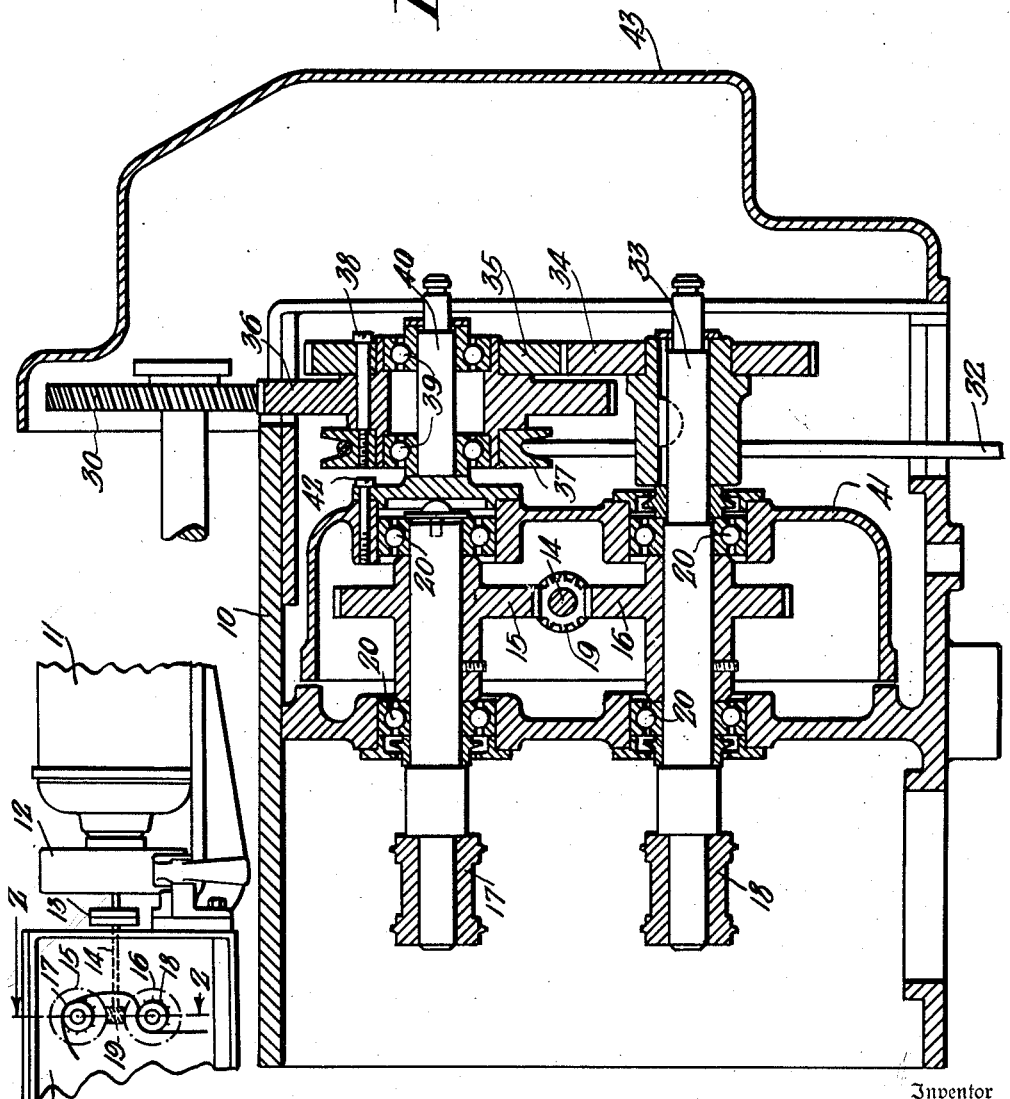
Inventor
Ralph H. Heacock
By
Attorney Patented Nov. 4, 1941

2,261,253

UNITED STATES PATENT OFFICE 2,261,253

FILM SOUND PRODUCER

Ralph H. Heacock, Oaklyn, N. J., assignor to Radio Corporation of America, a corporation of Delaware Application September 1, 1939, Serial No. 293,036

5 Claims. (Cl. 88—16.2)

This invention relates to film sound reproducers of the type adapted to use motion picture film having a sound track thereon, and relates more particularly to the driving mechanism for such a sound reproducer and the mechanism adapted to drive a motion picture machine therefrom.

It is customary in a combined motion picture projector and sound reproducer to drive the sound reproducer directly by an electric motor in order to secure the constancy of speed available from the motor and then to drive the picture head from the sound reproducer, as the picture projector is not sensitive to small variations in speed.

The sound reproducers often include a constant-speed sprocket which pulls the film past the sound-reproducing point and a hold-back sprocket around which the film is passed between the constant-speed sprocket and the take-up reel to prevent jerks of the take-up from being transmitted back to the constant-speed sprocket. An example of such an arrangement is shown in Loomis, et al., Patent No. 2,019,147, over which the present invention is an improvement.

In the apparatus according to the present invention, the drive mechanism is mounted in a removable gear box, and the main drive gear from the motor is located between the gears driving the two sprockets. The constant-speed sprocket is driven by itself by the gear engaging the gear on the motor shaft. The hold-back sprocket is similarly driven by a gear engaging the gear on the motor shaft, but the hold-back sprocket actuates a gear train which drives the picture projector and which also drives the takeup mechanism. Due to this arrangement, any jerks or other irregular motions transmitted to the gear train by the picture projector or the takeup mechanism are transmitted only to the hold-back sprocket and, due to the inertia of the motor armature and its flywheel, are not transmitted to the constant-speed sprocket.

One object of the invention is to provide an improved mechanism for driving a sound head.

Another object of the invention is to provide an improved mechanism for driving a motion picture projector from a sound head.

Another object of the invention is to provide an improved mechanism to driving a film takeup reel from a sound head.

Another object of the invention is to provide an improved mechanism for driving one of the sprockets of the sound head at a constant speed independent of irregularities tending to be imparted to the remainder of the mechanism.

Other and incidental objects of the invention will be apparent to those skilled in the art, and from a reading of the following specification and an inspection of the accompanying drawing in which Figure 1 is a side view of one end of the sound head and the motor drive therefor, and Figure 2 is a section through the sound head taken on the line 2—2 in Figure 1.

Referring first to Fig. 1, the soundhead is generally designated at 10, which indicates the housing thereof located externally of the soundhead is an electric motor 11 which is of some appriate constant speed type. This motor may be provided, if desired, with a flywheel 12 to eliminate any tendency toward oscillation or hunting. The motor is coupled to the soundhead shaft 14 by an appropriate flexible coupling 13 in order to avoid the necessity for accurate alignment of the motor and shaft. This shaft drives the gears 15 and 16 through the gear 19. These gears are preferably of the helical type and the angle of their teeth is preferably greater than 45° so that the pinion 19 may drive the gears 15 or 16 more readily than they can transmit jerks or irregularities of motion back to the pinion 19. The upper gear 15 carries on its shaft the constant speed sprocket 17 which pulls the film past the translating point in the soundhead as described in the above mentioned Loomis et al. Patent No. 2,019,147.

The film passes from the sprocket 17 in the form of a free loop to the holdback sprocket 18, which is driven by the gear 16. This holdback sprocket, as described above, serves to prevent jerks imparted to the film from the takeup mechanism from being transmitted back to the film on the constant speed sprocket 17. If jerks were transmitted to the film on the sprocket 17, the looseness of the sprocket holes in the film on the sprocket teeth would permit these jerks to be transmitted to the film at the translation point and thereby interfere with the accuracy of the sound reproduction. The shaft connecting the gear 15 and the sprocket 17 is mounted in ball bearings 20, as indicated, and this shaft is connected to nothing else except the pinion 19.

The gear 16 which drives the sprocket 18 is carried on the shaft 33, which extends beyond the gear box 41, and this shaft has keyed to it a gear 34. The gear 34 engages a gear 35 which is carried on the extended hub of the gear 36.

This hub of the gear 36 is also extended on the other side and carries the pulley 37, which actuates the takeup drive belt 32. Both the gear 35 and the pulley 37 are secured to the gear 36 by appropriate screws 38, thus forming a unitary assembly. This gear assembly is carried on the stub shaft 40 by the ball bearings 39 so as to be freely rotatable thereon. The gear 36, which is driven with the gear 35 by the gear 34, engages the gear 30 on the motion picture projector and thereby serves to drive the projector.

The stub shaft 40 is secured to the casing 41 by appropriate cap screws 42.

It will be apparent that any jerks or other irregularities transmitted to the gear 36 from the gear 30 will react through the gear 35 upon the gear 34. Likewise, any jerks or irregularities in the motion of the belt 32 will likewise be transmitted through the gear 35 to the gear 34. These jerks, however, which tend to cause irregularity in the motion of the shaft 33 will be transmitted by the gear 16 to the motor pinion 19. The armature of the motor 11 and the flywheel 12 are rotating at a relatively high speed due to the gear ratio between pinion 19 and the gears 15 and 16, and the effect of the mass of the motor armature and the flywheel 12 is multiplied by this gear ratio in resisting any irregularities of the motion of the gear 16. This effect is further enhanced by the angularity of the teeth of the gears 19 and 16 which tends to resist the transmission of motion from the gear 16 to the gear 19. It will thus be apparent that any tendency toward irregular motion by the gear 16 will be successfully operated by a high effective mass applied to the pinion 19, and none of this irregularity will be transmitted to the gear 15 and the constant speed sprocket 17.

The gears exterior to the gear box 41 may be protected, if desired, by an appropriate cover plate such as 43.

I claim as my invention:

1. In a soundhead having a constant speed sprocket and a holdback sprocket aligned to successively feed a film, parallel shafts supporting said sprockets, a gear on each of said shafts and connected thereto, a single driving gear between said gears and connected to a driving motor, and means connected to said holdback sprocket shaft for driving a picture projector and a takeup mechanism.

2. In a soundhead having a constant speed sprocket and a holdback sprocket aligned to successively feed a film, parallel shafts supporting said sprockets, a gear on each of said shafts and connected thereto, a single driving gear between said gears and connected to a driving motor, and means connected to said holdback sprocket shaft for driving a picture projector and takeup mechanism, said means including a gear unit coaxial with but independent of said constant speed sprocket shaft.

3. In a soundhead having a constant speed sprocket and a holdback sprocket aligned to successively feed a film, parallel shafts supporting said sprockets, a gear on each of said shafts and connected thereto, a single driving gear between said gears and connected to a driving motor, a second gear on and connected to said holdback sprocket shaft, and gearing in engagement with said second gear for driving a motion picture projector.

4. In a soundhead having a constant speed sprocket and a holdback sprocket aligned to successively feed a film, parallel shafts supporting said sprockets, a gear on each of said shafts and connected thereto, a single driving gear between said gears and connected to a driving motor, a second gear on and connected to said holdback sprocket shaft, and gearing in engagement with said second gear for driving a motion picture projector, said gearing including a gear unit approximately coaxial with but independent of said constant speed sprocket shaft.

5. In a soundhead having a constant speed sprocket and a holdback sprocket aligned to successively feed a film, parallel shafts supporting said sprockets, a gear on each of said shafts and connected thereto, a single driving gear between said gears and connected to a driving motor, a second gear on and connected to said holdback sprocket shaft, and gearing in engagement with said second gear for driving a motion picture projector, said gearing including a gear unit approximately coaxial with but independent of said constant speed sprocket shaft, said gear unit including one gear in engagement with said second gear, another gear unitary therewith and adapted to engage a gear on the motion picture projector, and a pulley adapted to drive the belt of take-up mechanism secured to said gear unit.

RALPH H. HEACOCK.